(12) United States Patent
Tuukkanen et al.

(10) Patent No.: US 9,360,333 B2
(45) Date of Patent: Jun. 7, 2016

(54) METHOD AND APPARATUS CALCULATING ESTIMATED TIME OF ARRIVAL FROM MULTIPLE DEVICES AND SERVICES

(71) Applicant: HERE Global B.V., Veldhoven (NL)

(72) Inventors: Marko Tapio Tuukkanen, Schlenzer (DE); Mikko Leimio, Veldhoven (NL)

(73) Assignee: HERE Global B.V., Veldhoven (NL)

( * ) Notice: Subject to any disclaimer, the term of this patent is extended or adjusted under 35 U.S.C. 154(b) by 0 days.

(21) Appl. No.: 14/451,062

(22) Filed: Aug. 4, 2014

(65) Prior Publication Data

US 2016/0033289 A1 Feb. 4, 2016

(51) Int. Cl.
*G01C 21/34* (2006.01)
(52) U.S. Cl.
CPC ...................... *G01C 21/34* (2013.01)
(58) Field of Classification Search
CPC .............................. G06Q 10/109; G01C 21/34
USPC ......................................................... 701/522
See application file for complete search history.

(56) References Cited

U.S. PATENT DOCUMENTS

| 6,317,686 | B1 | 11/2001 | Ran | |
|---|---|---|---|---|
| 6,374,176 | B1 * | 4/2002 | Schmier | G08G 1/123 340/988 |
| 6,618,668 | B1 * | 9/2003 | Laird | G08G 1/123 340/994 |
| 7,119,716 | B2 * | 10/2006 | Horstemeyer | B60R 25/102 340/502 |

(Continued)

FOREIGN PATENT DOCUMENTS

| WO | WO0208922 A1 | 1/2002 |
|---|---|---|
| WO | 02/16457 A2 | 2/2002 |

OTHER PUBLICATIONS

Bonetti P "HERE Auto: connect your car to the cloud", Here Three Sixty, the official HERE blog, Aug. 30, 2013, pp. 1-7.

(Continued)

*Primary Examiner* — Thomas Tarcza
*Assistant Examiner* — Alex C Dunn
(74) *Attorney, Agent, or Firm* — Ditthavong & Steiner, P.C.

(57) ABSTRACT

An approach is provided for calculating a final estimated time of arrival to at least one destination location based, at least in part, on multiple estimated time of arrival provided by one or more devices and/or services for one or more routing segments. The approach involves determining at least one route, wherein the at least one route includes a plurality of segments navigated using a plurality of devices or services. The approach also involves receiving at least one individual estimated time of arrival from at least one of the plurality of devices or services, wherein the at least one individual estimated time of arrival is for at least one of the plurality of segments associated with the at least one of the plurality of devices or services, and wherein the at least one individual estimated time of arrival is calculated independently by the at least one of the plurality of devices or services. The approach further involves causing, at least in part, a calculation of a total estimated time of arrival based, at least in part, on the at least one individual estimated time of arrival.

20 Claims, 15 Drawing Sheets

(56) References Cited

U.S. PATENT DOCUMENTS

| | | | |
|---|---|---|---|
| 2004/0093155 A1* | 5/2004 | Simonds | H04L 67/12 |
| | | | 701/532 |
| 2006/0031007 A1 | 2/2006 | Agnew et al. | |
| 2008/0033635 A1* | 2/2008 | Obradovich | H04L 29/12122 |
| | | | 701/533 |
| 2008/0103686 A1 | 5/2008 | Alberth et al. | |
| 2011/0077855 A1* | 3/2011 | Sumizawa | G01C 21/34 |
| | | | 701/533 |
| 2011/0231091 A1 | 9/2011 | Gourlay et al. | |
| 2012/0254763 A1* | 10/2012 | Protopapas | G06F 17/30554 |
| | | | 715/738 |
| 2013/0116882 A1* | 5/2013 | Link, II | G01C 21/3446 |
| | | | 701/31.4 |
| 2014/0095066 A1 | 4/2014 | Bouillet et al. | |

OTHER PUBLICATIONS

Notification of Transmittal of The International Search Report and The Written Opinion of The International Searching Authority, or The Declaration; International Search Report and Written Opinion of The International Searching Authority for International Application No. PCT/EP2015/066032, dated Nov. 10, 2015, 15 pages.

* cited by examiner

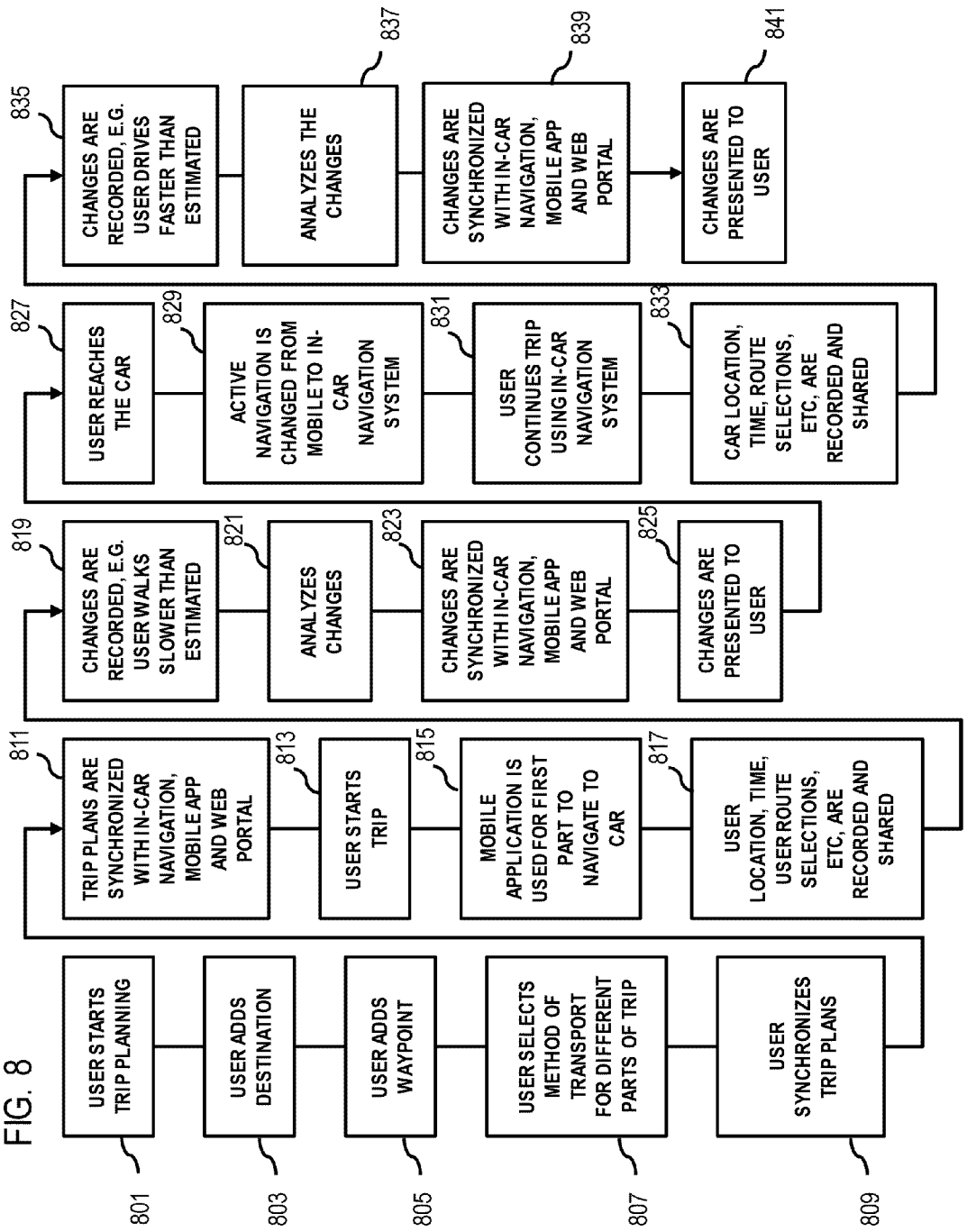

METHOD AND APPARATUS CALCULATING ESTIMATED TIME OF ARRIVAL FROM MULTIPLE DEVICES AND SERVICES

BACKGROUND

Service providers, vehicle and device manufacturers (e.g., wireless, cellular, etc.) are continually challenged to deliver value and convenience to consumers by, for example, providing compelling network services. One area of interest has been the development of location-based services to provide users of vehicles and mobile devices (e.g., mobile phones) tools for improving the quality of their travels. By way of example, many mobile devices are equipped with sensors and navigation applications for providing estimated time of arrival to the users. However, computation of the estimated time of arrival by a single device at a particular instant may result in error since various factors post-computation influence the estimated time of arrival. In addition, different devices have different capabilities and sensors, which lead to different estimation of the arrival time. As a result, real-time data from multiple devices and services must be taken into consideration to accomplish an accurate prediction of the estimated time of arrival.

SOME EXAMPLE EMBODIMENTS

Therefore, there is a need for an approach for calculating a final estimated time of arrival to at least one destination location based, at least in part, on multiple estimated time of arrival provided by one or more devices and/or services for one or more routing segments.

According to one embodiment, a method comprises determining at least one route, wherein the at least one route includes a plurality of segments navigated using a plurality of devices or services. The method also comprises receiving at least one individual estimated time of arrival from at least one of the plurality of devices or services, wherein the at least one individual estimated time of arrival is for at least one of the plurality of segments associated with the at least one of the plurality of devices or services, and wherein the at least one individual estimated time of arrival is calculated independently by the at least one of the plurality of devices or services. The method further comprises causing, at least in part, a calculation of a total estimated time of arrival based, at least in part, on the at least one individual estimated time of arrival.

According to another embodiment, an apparatus comprises at least one processor, and at least one memory including computer program code for one or more computer programs, the at least one memory and the computer program code configured to, with the at least one processor, cause, at least in part, the apparatus to determine at least one route, wherein the at least one route includes a plurality of segments navigated using a plurality of devices or services. The apparatus is also caused to receive at least one individual estimated time of arrival from at least one of the plurality of devices or services, wherein the at least one individual estimated time of arrival is for at least one of the plurality of segments associated with the at least one of the plurality of devices or services, and wherein the at least one individual estimated time of arrival is calculated independently by the at least one of the plurality of devices or services. The apparatus is further caused to cause, at least in part, a calculation of a total estimated time of arrival based, at least in part, on the at least one individual estimated time of arrival.

According to another embodiment, a computer-readable storage medium carries one or more sequences of one or more instructions which, when executed by one or more processors, cause, at least in part, an apparatus to determine at least one route, wherein the at least one route includes a plurality of segments navigated using a plurality of devices or services. The apparatus is also caused to receive at least one individual estimated time of arrival from at least one of the plurality of devices or services, wherein the at least one individual estimated time of arrival is for at least one of the plurality of segments associated with the at least one of the plurality of devices or services, and wherein the at least one individual estimated time of arrival is calculated independently by the at least one of the plurality of devices or services. The apparatus is further caused to cause, at least in part, a calculation of a total estimated time of arrival based, at least in part, on the at least one individual estimated time of arrival.

According to another embodiment, an apparatus comprises means for determining at least one route, wherein the at least one route includes a plurality of segments navigated using a plurality of devices or services. The apparatus also comprises means for receiving at least one individual estimated time of arrival from at least one of the plurality of devices or services, wherein the at least one individual estimated time of arrival is for at least one of the plurality of segments associated with the at least one of the plurality of devices or services, and wherein the at least one individual estimated time of arrival is calculated independently by the at least one of the plurality of devices or services. The apparatus further comprises means for causing, at least in part, a calculation of a total estimated time of arrival based, at least in part, on the at least one individual estimated time of arrival.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing the method of any of originally filed claims 1-10.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 8 is a flow diagram for calculating an estimated time of arrival in real-time from multiple devices and/or services, according to one example embodiment;

DESCRIPTION OF SOME EMBODIMENTS

Examples of a method, apparatus, and computer program for calculating a final estimated time of arrival to at least one destination location based, at least in part, on multiple estimated time of arrival provided by one or more devices and/or services for one or more routing segments, are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to providing estimated time of arrival in real-time, it is contemplated that the approach described herein may be applicable to any invention that can be modeled according the example processes described below and can benefit from the estimated time of arrival in real-time.

Figure 1:
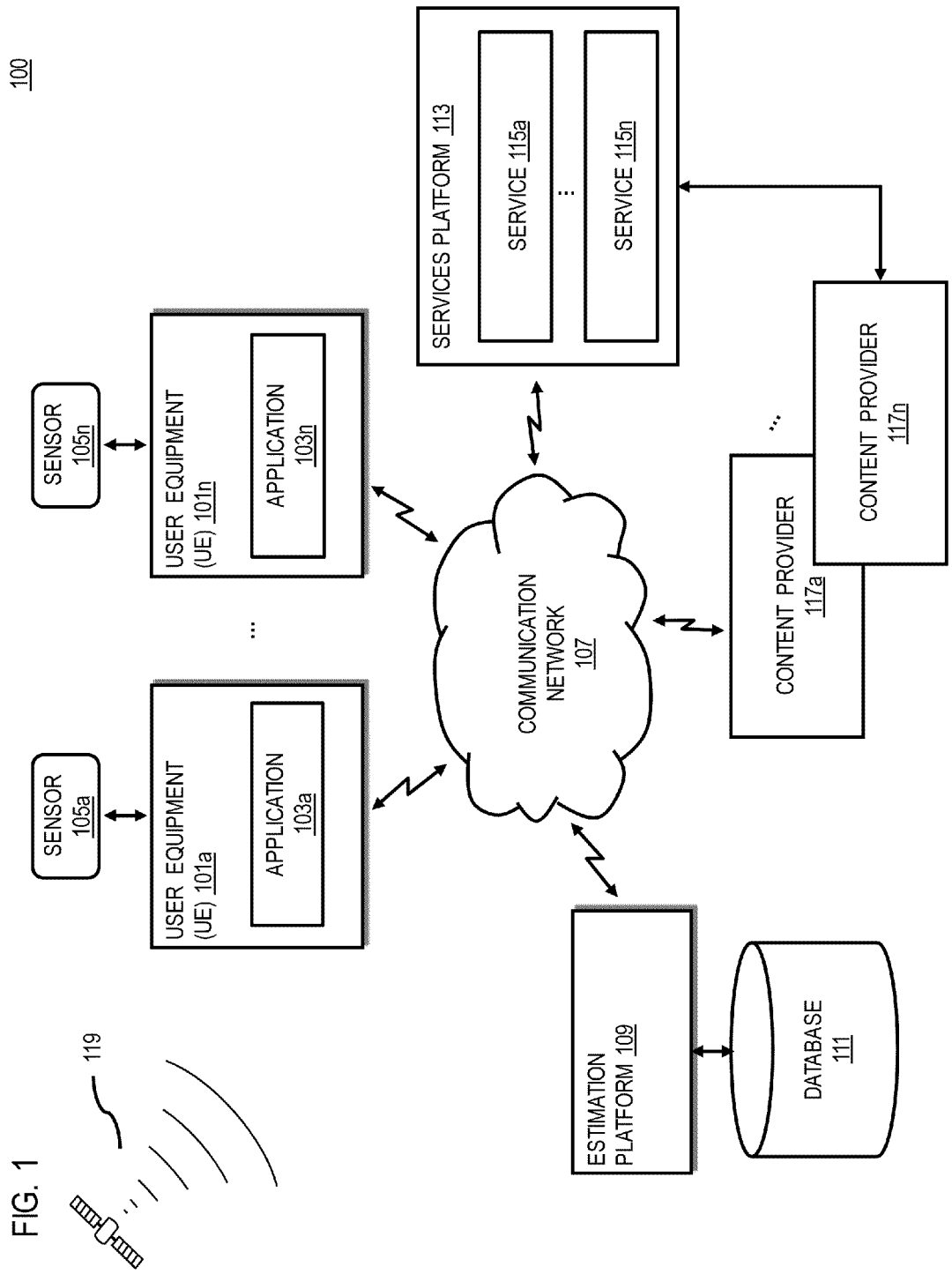
FIG. 1 is a diagram of a system capable of calculating a final estimated time of arrival to at least one destination location based, at least in part, on multiple estimated time of arrival provided by one or more devices and/or services for one or more routing segments, according to one embodiment.

FIG. 1 is a diagram of a system capable of calculating a final estimated time of arrival to at least one destination location based, at least in part, on multiple estimated time of arrival provided by one or more devices and/or services for one or more routing segments, according to one embodiment. In one scenario, the estimated time of arrival may refer to arrival on the starting point of next part of the trip, for example, estimated time of arrival to the train station from parking area, estimated time of arrival to the car from user's current position etc. It is natural that high degree of variability (e.g. user actions and events happening around a user) poses difficulty while predicting estimated time of arrival along certain route segments. The users want dependability in travel times but as traffic congestions continue to worsen, the estimated time for a given trip becomes more unpredictable. Providing accurate estimated time of arrival helps a user to reduce transport cost, as a user can make an informed decision on route choices. However, the estimated time of arrival suffers from too much interference from the environment. An incorrect estimation of the time of arrival impacts the latter parts of the trip, and latter part of the trip can be time restricted (e.g. public transport schedules, time limited streets, etc.). Such unreliability of the estimated time of arrival contributes to the negative user experience during travel. Therefore, there is a need to calculate and provide multiple user devices with accurate estimated time of arrival in multi-modal routing system (e.g. pedestrian navigation, walking, driving, public transit etc.).

To address this problem, a system 100 of FIG. 1 introduces the capability to calculate a final estimated time of arrival to at least one destination location based, at least in part, on multiple estimated time of arrival provided by one or more devices and/or services for one or more routing segments. In one scenario, mobile companion applications, in-car navigation systems, web portals etc., all upload their current estimated time of arrival with regards to relevant parts of the trip to a cloud based service. Then, the cloud based service may analyze the data in real-time to determine the impact of the changes in the estimated time of arrival for a routing segment to the latter part of the trip. Subsequently, the cloud based service may update the estimated time of arrival in real-time (e.g. a cloud based service updates all user devices and services on the new estimated time of arrival using a push-based method).

In one scenario, the system 100 provides real and accurate estimated time of arrival by taking into account various user devices and services, transportation methods and user decisions. In another scenario, each user devices and services may independently calculate the estimated time of arrival. Then, the changes are reflected in the latter parts of the trip and/or user devices used in the latter part of the trip. In one example embodiment, if a user is making a trip using a mobile device. The trip can include walking, driving, using public transport, transits, etc. The mobile device may not provide an accurate estimated time of arrival, though it may provide accurate estimated time of arrival for a certain routing segments (e.g. when a user is walking from one point of interest to another). On the other hand, there is embedded navigation system in a vehicle that calculates the best route for a user based, at least in part, on traffic conditions. The system 100 considers the capabilities of each user devices given that it impacts the estimated time of arrival. The system 100 utilizes the capabilities of each user device, thereby utilizing the functionality each device to the optimal level. For example, the embedded navigation system in a vehicle comprehends the traffic information in real-time and suggests the best alternative route in real-time. On the other hand, the mobile device can detect the walking pace of the user better than other devices, and may have the accurate information on the location of the users.

In one scenario, the estimated time of arrival is the most valuable at the end of the trip. The system 100 leverages this understanding, and calculates the final estimated time of arrival until the near-end of the trip from the data received from multiple devices and services. In another scenario, the estimated time of arrival generated by the multiple devices and services may be complied to have a reliable estimated time of arrival for the final destination, and the estimated time of arrival is shared by the one or more devices. As discussed, the system 100 utilizes multiple user devices for a trip to represent real life situations, for example, a mobile application cannot reliably estimate the context of at least one vehicle. In another scenario, the system 100 uses the real time data of multiple devices and supports multi-modal routing.

The system 100 comprises of a UE 101a-101n (hereinafter UE 101). By way of example, the UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 101 can support any type of interface to the user (such as "wearable" circuitry, etc.). In one embodiment, the one or more vehicles may have cellular or Wi-Fi connection either through the inbuilt communication equipment or from the UE 101 associated with the vehicles. The applications 103 may assist in conveying sensor information via the communication network 107.

The system 100 comprises of applications 103a-103n (hereinafter applications 103). By way of example, the applications 103 may be any type of application that is executable at the UE 101, such as location-based service applications, navigation applications, mapping application, calendar applications, content provisioning services, camera/imaging application, media player applications, social networking applications, and the like. In one embodiment, one of the applications 103 at the UE 101 may act as a client for the estimation platform 109 and may perform one or more functions associated with the functions of the estimation platform 109 by interacting with the estimation platform 109 over the communication network 107.

The system 100 comprises of sensors 105a-105n (hereinafter sensors 105). By way of example, the sensors 105 may be any type of sensor. In certain embodiments, the sensors 105 may include, for example, a global positioning sensor for gathering location data (e.g., GPS), a network detection sensor for detecting wireless signals or receivers for different short-range communications (e.g., Bluetooth, Wi-Fi, Li-Fi, near field communication etc.), temporal information, a camera/imaging sensor for gathering image data, an audio recorder for gathering audio data, and the like. In one scenario, the sensors 105 may include, oriental sensors augmented with height sensor and acceleration sensor, tilt sensors to detect the degree of incline or decline of the vehicle along a path of travel, etc. In one example embodiment, the UE 101 may include GPS receivers to obtain geographic coordinates from satellites 119 for determining current location and time associated with at least one UE 101. In another example embodiment, the sensors 105 may detect weather data, traffic information, etc. Further, sensors about the perimeter of the vehicle may detect the relative distance of the vehicle from sidewalks, lane or roadways, the presence of other vehicles, pedestrians, traffic lights, potholes and any other objects, or a combination thereof. Still further, the one or more sensors may provide in-vehicle navigation services, wherein one or more location based services may be provided to the at least one UE 101 associated with the at least one user of the vehicle and/or at least one other UE 101 associated with the at least one vehicle.

By way of example, the communication network 107 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The system 100 comprises of the estimation platform 109. In one embodiment, the estimation platform 109 may be a platform with multiple interconnected components. The estimation platform 109 may include multiple servers, intelligent networking devices, computing devices, components and corresponding software for calculating a final estimated time of arrival to at least one destination location based, at least in part, on multiple estimated time of arrival provided by one or more devices and/or services for one or more routing segments. In one embodiment, the estimation platform 109 may be a cloud based service that receives estimated time of arrival in real-time for all the relevant parts of the trip from one or more UE 101's, one or more UE 101's associated with a vehicle (e.g. in-car navigation system), web portals, or a combination thereof.

In one example embodiment, at least one vehicle is an autonomous vehicle with in-car navigation system supported by mobile companion applications and web portals. The users of such autonomous vehicles can plan trips using the in-car navigation system, the web portal, or the mobile applications. Then, the user can use all these devices and services to navigate through the trip. Hence, when a trip is planned, the user may include parts in which in-car navigation system (e.g. driving), mobile device (e.g. pedestrian navigation), or a web service (e.g. public transport information) is used. Then, the estimation platform 109 may analyze the part related to in-car navigation system for determining routing information in real-time. Similarly, the estimation platform 109 may analyze the part related to mobile device for pace maintained by a user. In one embodiment, one or more UE 101's associated with at least one user, at least one vehicle, or a combination thereof determines real-time location of at least one user. Then, the one or more UE 101's calculates the estimated time of arrival for at least one routing segment based on the real-time location of at least one user. Subsequently, the one or more UE 101's may upload the multiple estimated time of arrival to the estimation platform 109 in real-time. The estimation platform 109 may process the received multiple estimated time of arrival to determine any variation in the timing information that impacts the total estimated time of arrival to at least one user location.

In one embodiment, the estimation platform 109 may determine a change in the estimated time of arrival in at least one routing segment due to a sudden obstruction (e.g. a road accident). The estimation platform 109 may calculate a new estimated time of arrival and shares the total estimated time of arrival with the one or more UE 101. In another embodiment, the estimation platform 109 causes a synchronization of a trip plan with the multiple UE 101's. In one scenario, the trip plan include at least one user location, routing information, one or more waypoints, modes of transportation for different trip segments, or a combination thereof.

In one embodiment, the one or more UE 101's may record the changes in the estimated time of arrival in at least one routing segment. In one scenario, a UE 101 (e.g. a mobile device) may estimate the time of arrival from user's house to a parking location to be 10 minutes based, at least in part, on user's normal walking pace. The UE 101 may monitor user movement via sensors 105. If a user is walking in a slower pace, the UE 101 may re-calculate the estimated time of arrival for the routing segment since it will take more than 10 minutes to reach the parking location. The mobile device may record the change and shares the information with the estimation platform 109. In another scenario, the one or more UE 101's may process real-time traffic information, public transport schedule information, real-time speed information, real-time obstruction information, or a combination thereof to determine the estimated time of arrival.

In one scenario, the estimation platform 109 may receive information on user's walking speed from the UE 101 associated with at least one user (e.g. mobile device). Then, the estimation platform 109 may determine the estimated time of arrival for a particular routing segment based, at least in part, on the information provided by the UE 101 associated with the user. In another scenario, the estimation platform 109 may receive information on traffic condition, speed of the vehicle, or a combination thereof from a UE 101 associated with at least one vehicle (e.g. embedded vehicular navigation system). Then, the estimation platform 109 may determine the estimated time of arrival for a particular routing segment based, at least in part, on the information provided by the UE 101 associated with the vehicle. In a further scenario, the mapping service of a car may be outdated, and needs updating. Since the user needs to pay for an updated mapping service, a device based calculation may be done by the estimation platform 109. Since, the information being transmitted to a cloud based service is only related to the estimated time of arrival, there are no privacy issues, and the information shared is not voluminous to deplete the data bandwidth.

In one embodiment, the estimation platform 109 may include or have access to database 111 to access or store any kind of data, such as estimated time of arrival, location proximity information, temporal information, contextual information, historical user information etc. Data stored in the database 111 may, for instance, be provided by the UE 101, the sensors 105, the services platform 113, one or more services 115a-115n (or services 115), or one or more content providers 117a-117n (or content providers 117).

In one embodiment, the services platform 113 may include any type of service. By way of example, the services platform 113 may include location based services, content (e.g., text, images, etc.) provisioning services, application services, storage services, contextual information determination services, information (e.g., weather, traffic news, time etc.) based services, social networking services, etc. In one embodiment, the services platform 113 may interact with the UE 101, the estimation platform 109 and the content providers 117 to supplement or aid in the processing of the content information.

In one embodiment, the services 115 may be an online service that reflects interests and/or activities of users. In one scenario, the services 115 provide representations of each user (e.g., a profile), his/her social links, and a variety of additional information. The services 115 allow users to share location information, activities information, contextual information, historical user information and interests within their individual networks, and provides for data portability.

The content providers 117 may provide content to the UE 101, the estimation platform 109, and the services 115 of the services platform 113. The content provided may be any type of content, such as textual content, image content, video content etc. In one embodiment, the content providers 117 may provide content that may supplement content of the applications 103, sensors 105, or a combination thereof. In one embodiment, the content providers 117 may also store content associated with the UE 101, the estimation platform 109, and the services 115 of the services platform 113. In another embodiment, the content providers 117 may manage access to a central repository of data, and offer a consistent, standard interface to data.

By way of example, the UE 101, the estimation platform 109, the services platform 113, and the content providers 117 communicate with each other and other components of the communication network 107 using well known, new or still developing protocols. In this context, a protocol includes a set of rules defining how the network nodes within the communication network 107 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
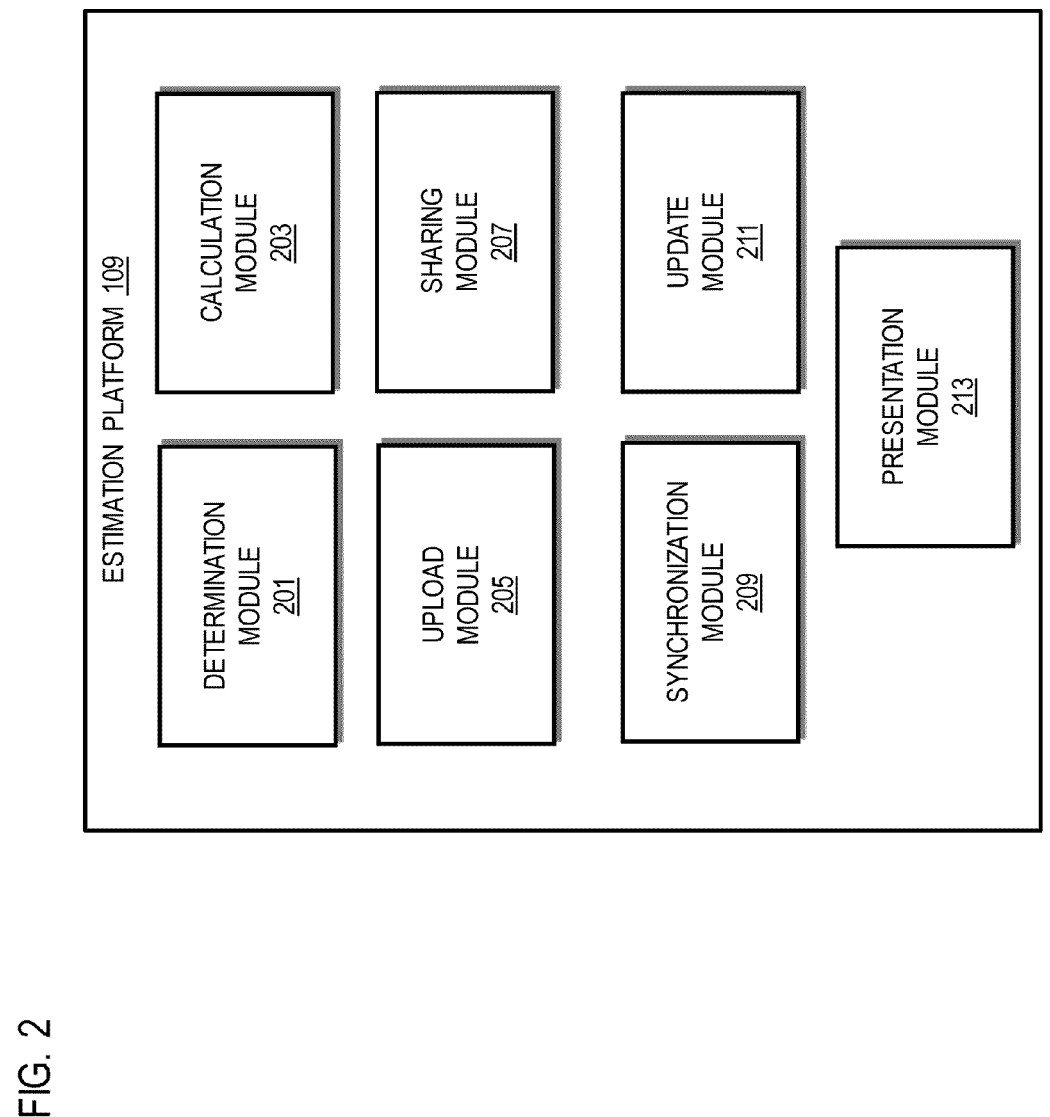
FIG. 2 is a diagram of the components of the estimation platform 109, according to one embodiment.

FIG. 2 is a diagram of the components of the estimation platform 109, according to one example embodiment. By way of example, the estimation platform 109 includes one or more components for calculating a final estimated time of arrival to at least one destination location based, at least in part, on multiple estimated time of arrival provided by one or more devices and/or services for one or more routing segments, according to one embodiment. In this embodiment, the estimation platform 109 includes a determination module 201, a calculation module 203, an upload module 205, a sharing module 207, a synchronization module 209, an update module 211 and a presentation module 213. It is contemplated that the functions of these components may be combined in one or more components or performed by other components of equivalent functionality.

In one embodiment, the determination module 201 may determine a real-time position of at least one user to cause a presentation of time-based information for at least one travel comprising plurality of segments of routing information. In another embodiment, the determination module 201 may process the received estimated time of arrival from plurality of devices or services. Then, the determination module 201 may determine, at least in part, a variation in the timing information that impacts the total estimated time of arrival to at least one user location. In a further embodiment, the determination module 201 may determine at least one time requirement for at least one routing segment. Then, the determination module 201 may determine any changes that affect subsequent routing segments.

In one embodiment, the calculation module 203 may cause, at least in part, a calculation of the estimated time of arrival by at least one device associated with at least one vehicle, at least one other device associated with at least one user, or a combination thereof for at least one routing segment. In another embodiment, the calculation module 203 may cause, at least in part, a recalculation of routing information, estimated time of arrival, or a combination thereof based, at least in part, on real-time traffic information, public transport schedule information, real-time speed information, real-time obstruction information, or a combination thereof. In a further embodiment, the calculation module 203 may calculate the total estimated time of arrival based on the individual estimated time of arrival.

In one embodiment, the upload module 205 may cause, at least in part, an uploading of estimated time of arrival in real-time to a cloud based service by least one device associated with at least one vehicle, at least one other device associated with at least one user, or a combination thereof.

In one embodiment, the sharing module 207 may cause, at least in part, a triggering of the sharing of the new estimated time of arrival via the last device associated with at least one vehicle, at least one user, or a combination thereof. In another embodiment, the sharing module 207 may cause, at least in part, a sharing of the total estimated time of arrival with at least one device associated with at least one vehicle, at least one other device associated with at least one user, or a combination thereof. In one scenario, the sharing module 207 may share the changes in the estimated time of arrival with the users of other devices via at least one last device in the route. The last device in the route may be the device a user uses to communicate with other users, for example, if a user has to walk the last mile to reach a destination, the user may use his mobile device to communicate with the person he is planning to meet. On the other hand, if a user is driving to a destination to pick-up someone, then the communication is done by the car. This also applies to any possible replies from other users via their respective UE 101s.

In one embodiment, the synchronization module 209 may cause a synchronization of travel information with at least one device associated with at least one vehicle, at least one other device associated with at least one user, or a combination thereof. In one scenario, travel information includes real time position of at least one user, routing information, waypoints information, transportation information per routing segment, or a combination thereof. In another embodiment, the synchronization module 209 may cause a synchronization of one or more changes in the travel information with at least one device associated with at least one vehicle, at least one other device associated with at least one user, or a combination thereof. In a further embodiment, the synchronization module 209 may cause a synchronization of the total estimated time of arrival among the plurality of devices or services.

In one embodiment, the update module 211 may cause an updating of the total estimated time of arrival based, at least in part, on the updated individual estimated time of arrival.

In one embodiment, the presentation module 213 may cause, at least in part, a presentation of the time requirement to the at least one device associated with at least one vehicle, at least one other device associated with at least one user, or a combination thereof. The presentation of the time requirement includes, at least in part, at least one timer indicating an estimated time remaining, an elapsed time, or a combination thereof. In another embodiment, the presentation module 213 may cause a presentation of estimated time of arrival for multimodal routing information. In one scenario, multimodal routing information include pedestrian navigation, drive navigation, public transport navigation, or a combination thereof. This module obtains a set of summary statistics from other modules. Then, the module continues with generating a presentation corresponding to the user location. Subsequently, the module continues with providing a presentation of data set where the presentation could be depicted in one or more visual display units.

The above presented modules and components of the estimation platform 109 can be implemented in hardware, firmware, software, or a combination thereof. Though depicted as a separate entity in FIG. 1, it is contemplated that the estimation platform 109 may be implemented for direct operation by respective UE 101. As such, the estimation platform 109 may generate direct signal inputs by way of the operating system of the UE 101 for interacting with the applications 103. In another embodiment, one or more of the modules 201-213 may be implemented for operation by respective UEs, the estimation platform 109, or combination thereof. Still further, the estimation platform 109 may be integrated for direct operation with services 115, such as in the form of a widget or applet, in accordance with an information and/or subscriber sharing arrangement. The various executions presented herein contemplate any and all arrangements and models.

Figure 3:
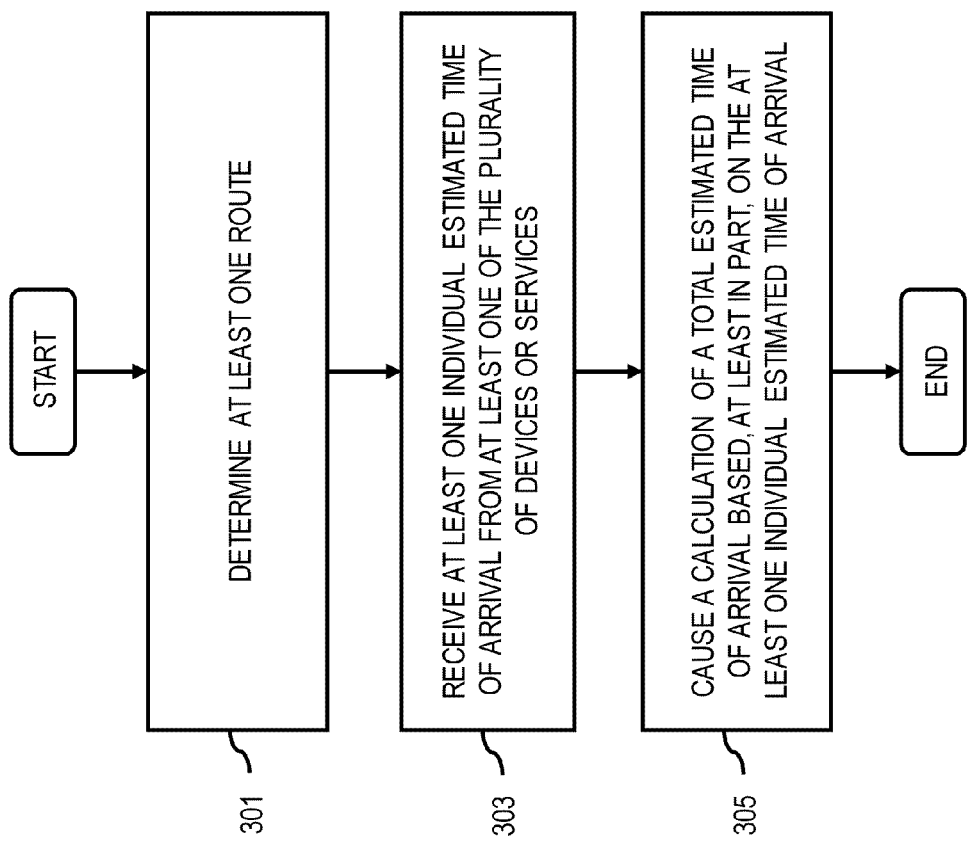
FIG. 3 is a flowchart of a process for calculating total estimated time of arrival based, at least in part, on the plurality of estimated time of arrival received from one or more devices or services, according to one embodiment.
Figure 11:
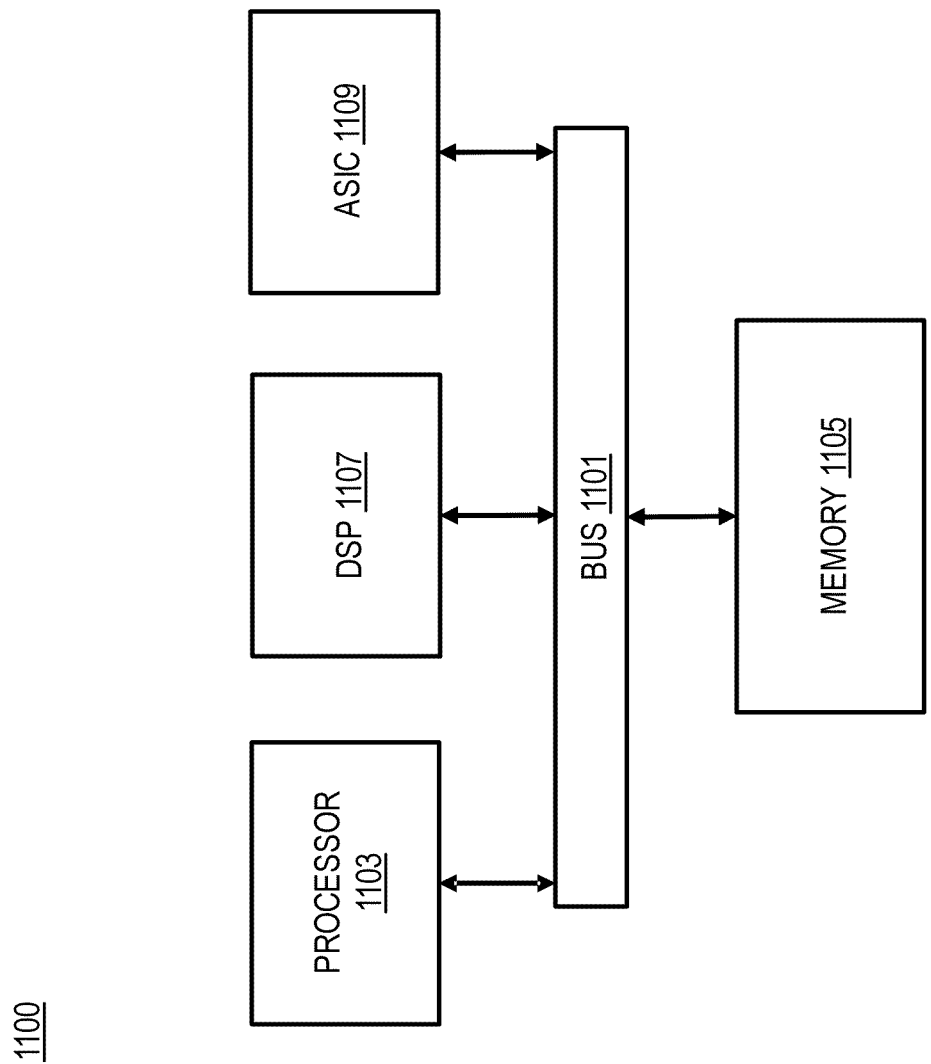
FIG. 11 is a diagram of a chip set that can be used to implement an embodiment of the invention.

FIG. 3 is a flowchart of a process for calculating total estimated time of arrival based, at least in part, on the plurality of estimated time of arrival received from one or more devices or services, according to one embodiment. In one embodiment, the estimation platform 109 performs the process 300 and is implemented in, for instance, a chip set including a processor and a memory as shown in FIG. 11.

In step 301, the estimation platform 109 may determine at least one route, wherein the at least one route includes a plurality of segments navigated using a plurality of devices or services. In one embodiment, the plurality of segments, the plurality of devices or services, or a combination thereof are associated with multiple modes of transport. In one scenario, a user may schedule a train ride to a destination, at which point the estimation platform 109 may gather information on the current schedules from the servers of the train station, and adds it to the estimated time of arrival. In another scenario, a route may include driving to a park, and walking through the park to the train station to reach a destination. As a result, there can be an estimated time of arrival at the park, an estimated time of arrival at the train station, the estimated time of arrival at the destination. In a further scenario, the estimated time of arrival at the destination from the train station may include real-time information on boarding the train, the number of stops, the number of passengers in the train etc.

In step 303, the estimation platform 109 may receive at least one individual estimated time of arrival from at least one of the plurality of devices or services. In one embodiment, the at least one individual estimated time of arrival is for at least one of the plurality of segments associated with the at least one of the plurality of devices or services. In another embodiment, the at least one individual estimated time of arrival is calculated independently by the at least one of the plurality of devices or services. In one scenario, a user may use multiple devices at the same time (e.g. mobile device, wearable devices etc.) to estimate the time of arrival. As a result, the generated estimated time of arrival may be different. Therefore, the estimation platform 109 may calculate an average of the value determined by the one or more devices to generate an accurate estimated time of arrival.

In step 305, the estimation platform 109 may cause, at least in part, a calculation of a total estimated time of arrival based, at least in part, on the at least one individual estimated time of arrival. In one scenario, the estimation platform 109 may combine the information received on the estimated time of arrival from a vehicle, a mobile device, a service provider, etc. to determine a final total estimated time of arrival. In one scenario, a vehicle, a mobile device, a service provider, etc. may provide estimated time of arrival for their respective routing segments.

Figure 4:
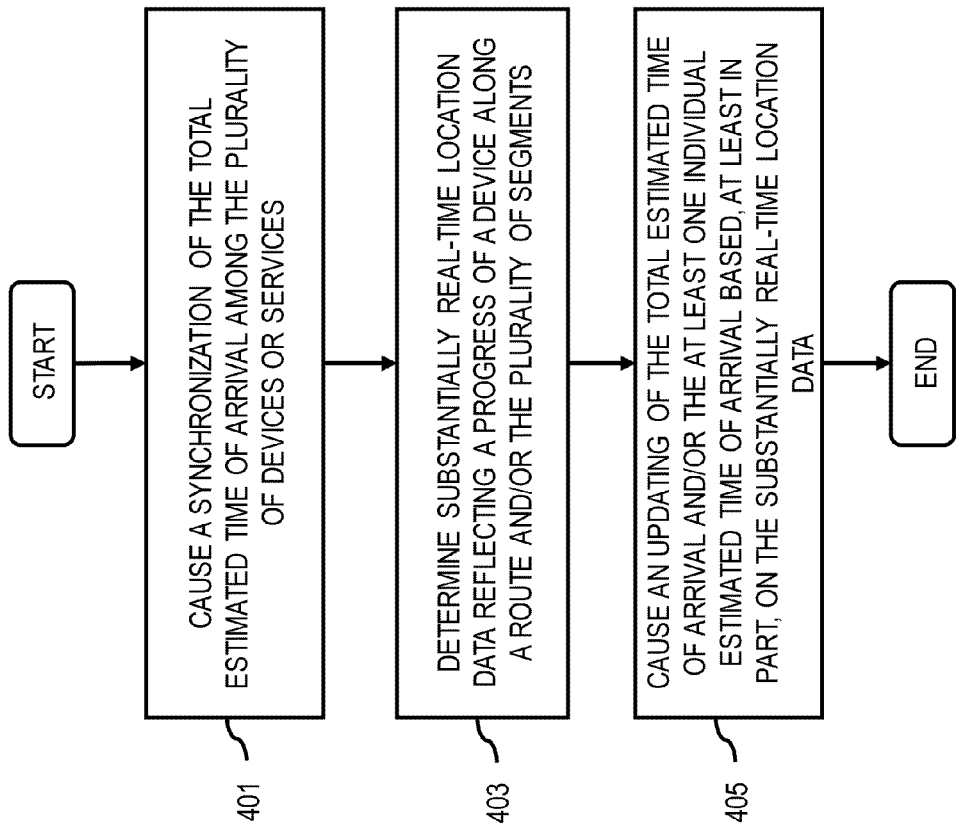
FIG. 4 is a flowchart of a process for causing synchronization among the one or more devices and/or services to update the estimated time of arrival in real-time, according to one embodiment.

FIG. 4 is a flowchart of a process for causing synchronization among the one or more devices and/or services to update the estimated time of arrival in real-time, according to one embodiment. In one embodiment, the estimation platform 109 performs the process 400 and is implemented in, for instance, a chip set including a processor and a memory as shown in FIG. 11.

In step 401, the estimation platform 109 may cause, at least in part, a synchronization of the total estimated time of arrival among the plurality of devices or services. In one scenario, a user can control the sharing of the estimated time of arrival with the recipient. The user may define whom he wants to share it with (e.g. a user may share the estimated time of arrival with his family and friends). Further, a user may share the estimated time of arrival with another user whom he is going to meet. In one scenario, the intention of the user to meet other users is determined by the estimation platform 109, whereupon the waypoint or destination may be set to the location of the other users. In another scenario, the estimation platform 109 may recommend one or more user with whom to share the estimated time of arrival with. Subsequently, the estimation platform 109 may cause synchronization of the total estimated time of arrival among the selected devices.

In step 403, the estimation platform 109 may determine at least substantially real-time location data reflecting a progress of at least one device along the at least one route, the plurality of segments, or a combination thereof. In one embodiment, the at least substantially real-time location data is collected respectively by the plurality of devices or services.

In step 405, the estimation platform 109 may cause, at least in part, an updating of the total estimated time of arrival, the at least one individual estimated time of arrival, or a combination thereof based, at least in part, on the substantially real-time location data. In one scenario, any user actions during a travel impacts the final estimated time of arrival. In one example embodiment, a user plans a trip via his UE 101 and gets an estimated time of arrival of 5:00 p.m. If the user walks at the assessed speed the estimated time of arrival stays the same. The estimated speed may be determined by machine based learning, for example, the system knows from the sensors that the user walks at a certain pace at a particular time of the day. If the user does a surprising stop to get a coffee, that basically adds five minutes to the estimated time of arrival (real time monitoring of every actions). Since the user is already five minutes late, the estimation platform 109 may determine traffic conditions for the next routing segment to assess whether the user needs to spend more time on traffic. The estimated time of arrival for the next waypoint may be calculated while the user is drinking the coffee based on the delay. Further, the UE 101 may also detect that the user is walking slower than before and may add additional time to the total estimated time of arrival. Basically, the estimated time of arrival is updated in real-time as the user is approaching the destination.

Figure 5:
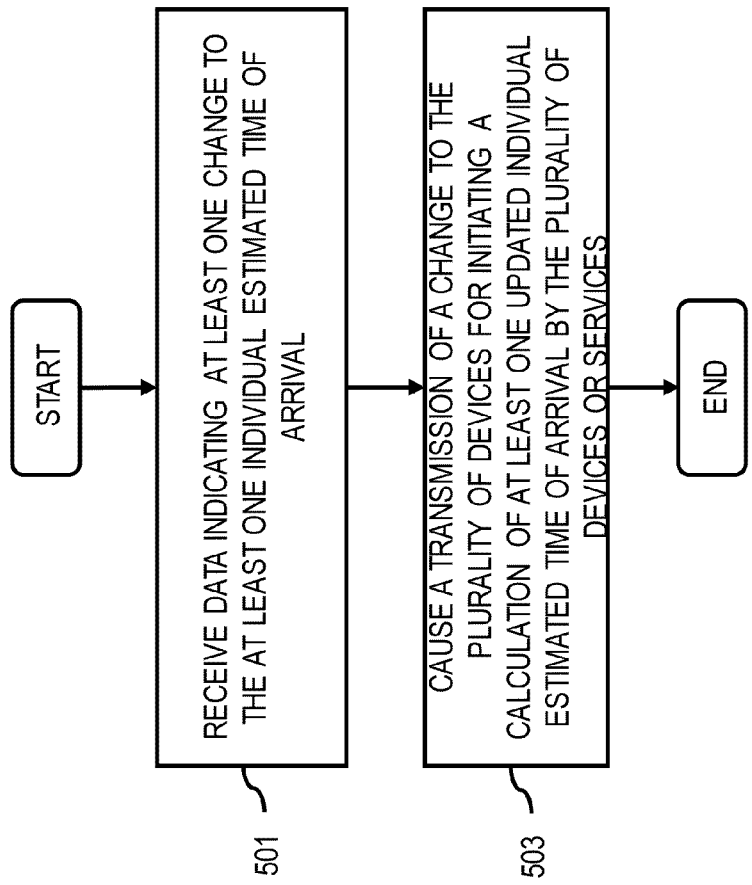
FIG. 5 is a flowchart of a process for causing a calculation of the updated estimated time of arrival upon receiving notification on the changes to the individual estimated time of arrival, according to one embodiment.

FIG. 5 is a flowchart of a process for causing a calculation of the updated estimated time of arrival upon receiving notification on the changes to the individual estimated time of arrival, according to one embodiment. In one embodiment, the estimation platform 109 performs the process 500 and is implemented in, for instance, a chip set including a processor and a memory as shown in FIG. 11.

In step 501, the estimation platform 109 may receive data indicating at least one change to the at least one individual estimated time of arrival. In one embodiment, the data indicating the at least one change includes substantially real-time sensor data respectively collected by and/or private to the plurality of devices. In one scenario, a user may be talking while driving, such activity reduces the driving speed. The UE 101 associated with a vehicle (e.g. embedded vehicular navigation application) may not observe such activity, but the UE 101 associated with the user (e.g. a mobile device) may sense such activity and may generate a new estimated time of arrival and then share this information to with the vehicle. Such, sharing of estimated time of arrival between one or more devices generates the most accurate results.

In step 503, the estimation platform 109 may cause, at least in part, a transmission of the at least one change to the plurality of devices for initiating a calculation of at least one updated individual estimated time of arrival by the plurality of devices or services. In one scenario, the estimation platform 109 may trigger rerouting based on the updated estimated time of arrival. For example, if a user stops over for a coffee this might lead to a delay, then the estimation platform 109 may calculate a different route for the remaining travel portion to compensate for the delay (e.g. a straight route may be selected over a route with multiple crossing and red lights). The rerouting can occur when the user is drinking coffee, and the mobile device and the vehicle may co-ordinate and re-calculate.

Figure 6:
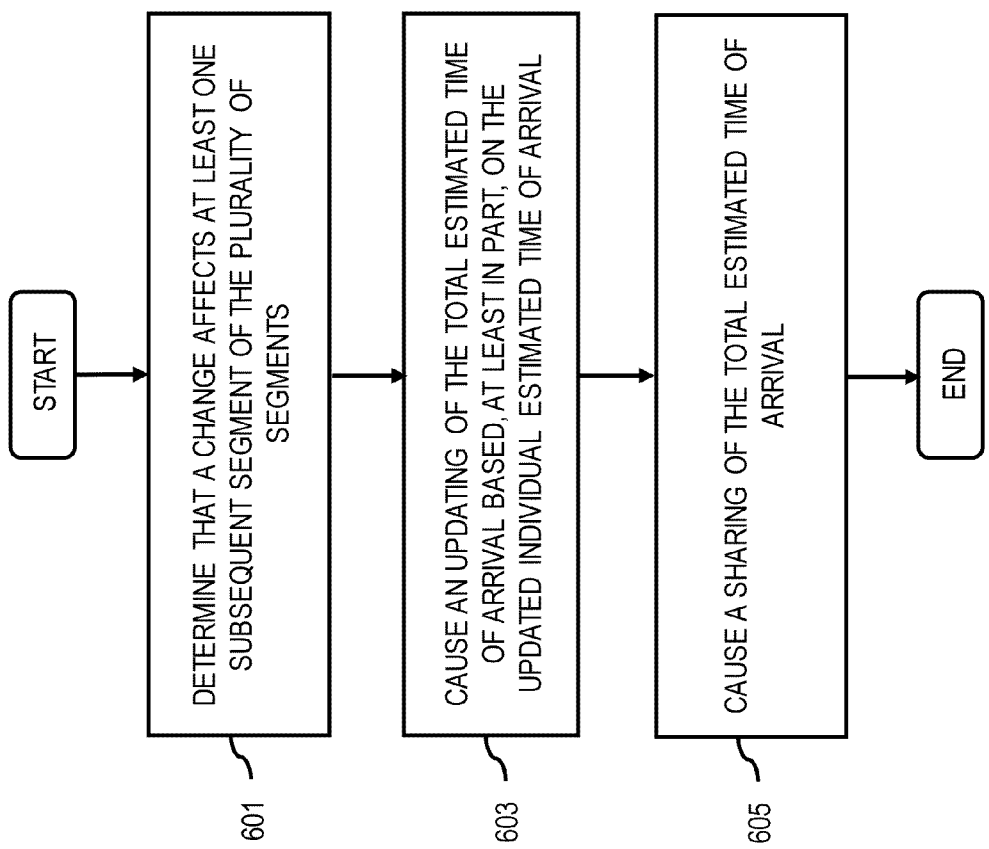
FIG. 6 is a flowchart of a process for sharing the total estimated time of arrival upon completion of the updates, according to one embodiment.

FIG. 6 is a flowchart of a process for sharing the total estimated time of arrival upon completion of the updates, according to one embodiment. In one embodiment, the estimation platform 109 performs the process 600 and is implemented in, for instance, a chip set including a processor and a memory as shown in FIG. 11.

In step 601, the estimation platform 109 may determine that the at least one change affects at least one subsequent segment of the plurality of segments. In one embodiment, the at least one change affects the at least one subsequent segment of the plurality of segments if the at least one change results in (a) a re-routing of at least one of the plurality of segments; (b) a difference between the at least one updated individual estimated time of arrival and the at least one individual estimated time of arrival beyond at least one threshold criterion; (c) a combination thereof.

In step 603, the estimation platform 109 may cause, at least in part, an updating of the total estimated time of arrival based, at least in part, on the at least one updated individual estimated time of arrival. In one scenario, the estimation platform 109 may implement its machine learning capability. If a user travels back and forth from work and home every day. Then this pattern may be identified by the estimation platform 109, and can guess the destination.

In step 605, the estimation platform 109 may cause, at least in part, a sharing of the total estimated time of arrival. In one embodiment, the sharing of the total estimated time of arrival is performed by at least one of the plurality of devices or services associated with a last one of the plurality of segments. In one scenario, there is a need to calculate and share independent estimated time of arrival received from multiple devices or services. In another scenario, the at least one last UE 101 may do the sharing of the estimated time of arrival. For example, a user is in the last routing segment of his travel and is walking towards the final destination. Afterward, the estimated time of arrival changes due to the unpredicted weather conditions. Then, the UE 101 (e.g. wearable devices, mobile devices etc.) may update the estimated time of arrival and share it with the estimation platform 109.

Figure 7:
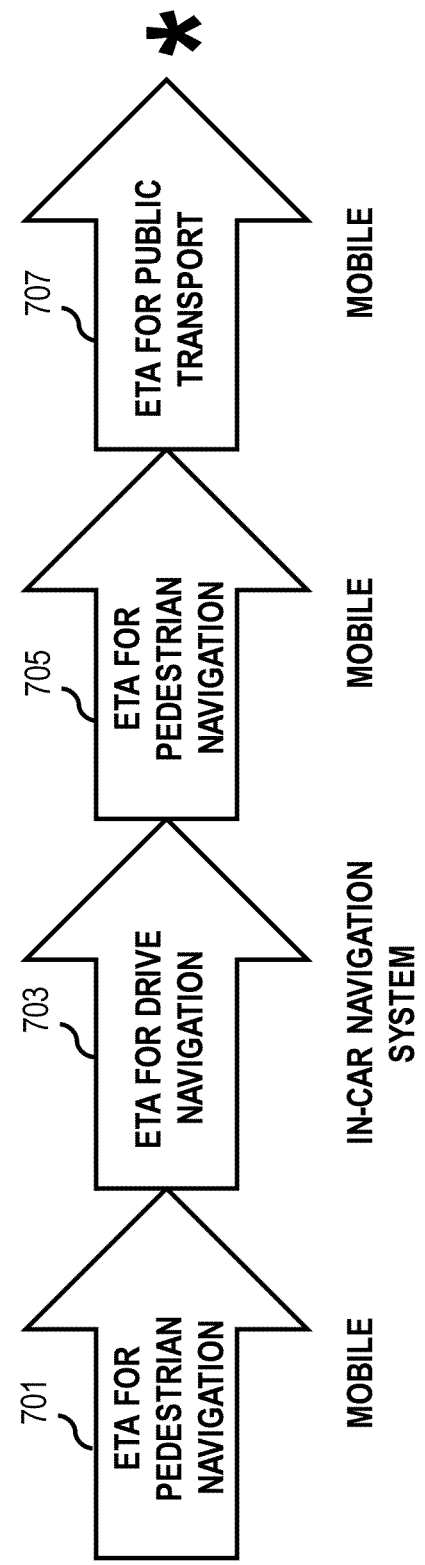
FIG. 7 is a diagram that represents a scenario wherein the estimation platform 109 prioritizes one or more UE 101's based, at least in part, on device capability information, according to one example embodiment.
Figure 9A:
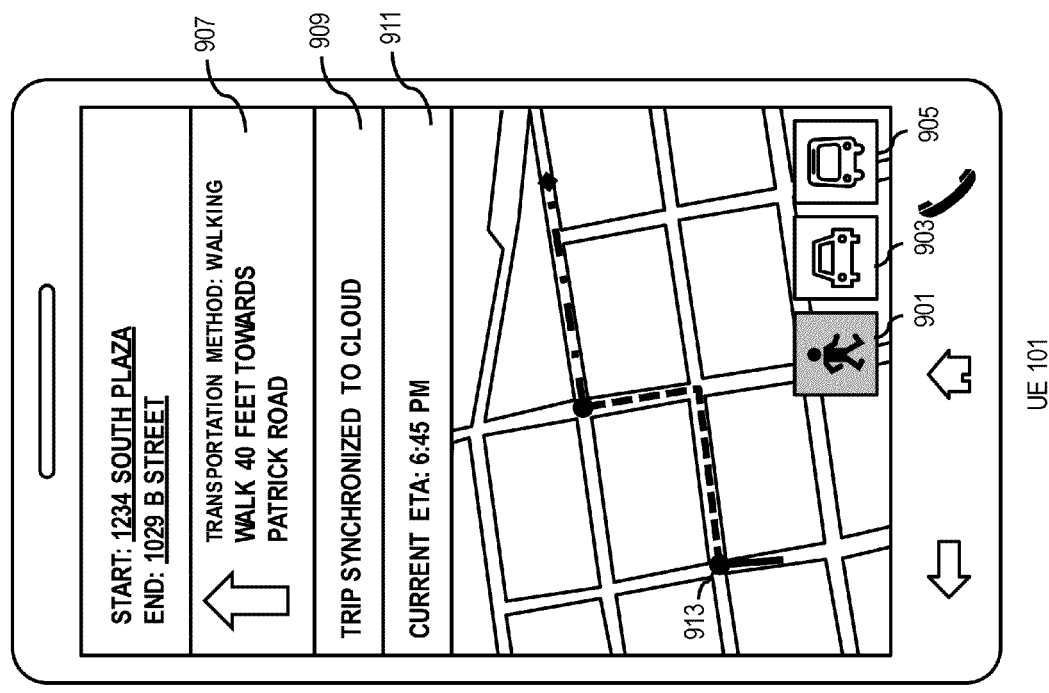
FIGS. 9 A-D are user interface diagrams that represent a scenario wherein a user is presented with a real-time estimate of the arrival time, according to one example embodiment.
Figure 9B:
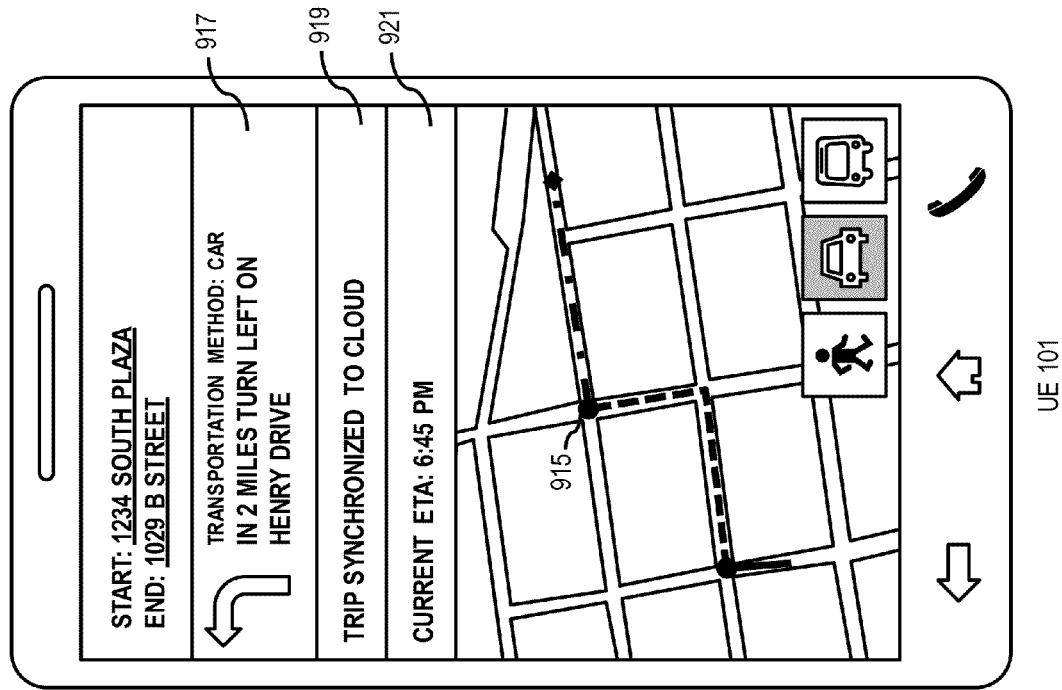
Figure 9C:
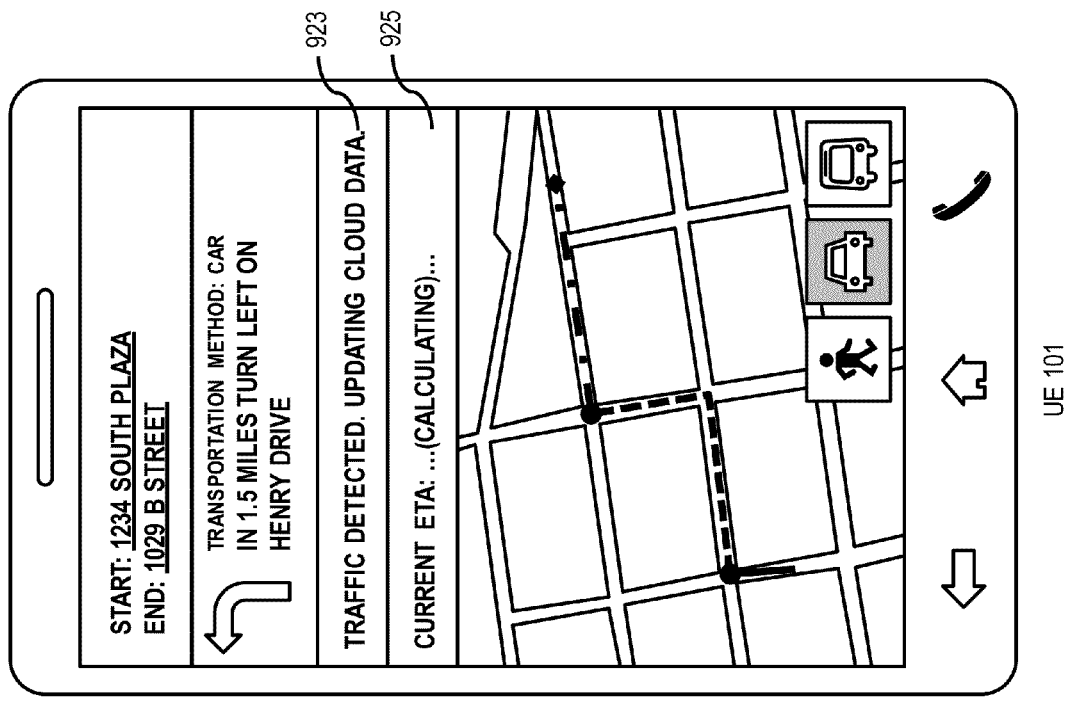
Figure 9D:
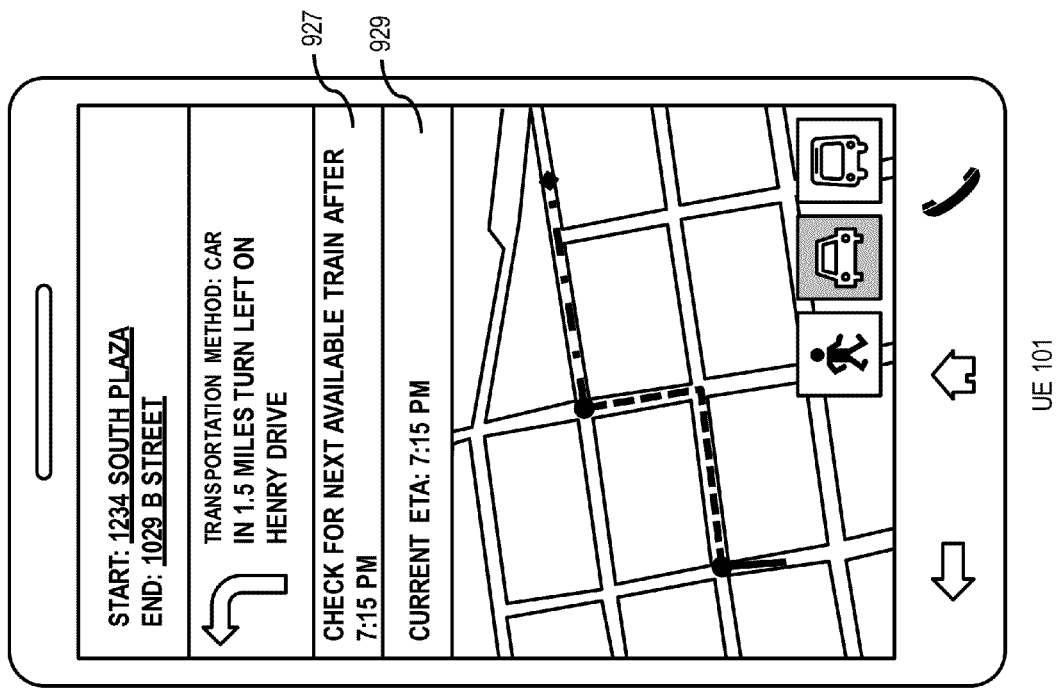

FIG. 7 is a diagram that represents a scenario wherein the estimation platform 109 prioritizes one or more UE 101s based, at least in part, on device capability information, according to one example embodiment. Since, travel to at least one destination includes various modes of transportation, the estimation platform 109 may rank the UE 101's based on their functionality. For example, an embedded navigation system in a vehicle may have accurate information on the traffic situations than a mobile device. On the other hand, a mobile device may have accurate information with regards to the pace of a user. In one scenario, the estimation platform 109 may determine that a user is walking. Then, the estimation platform 109 may process the information provided by a mobile device to determine the real-time location of a user, the walking speed of a user, or a combination thereof [701]. Subsequently, the estimation platform 109 may calculate the estimated time of arrival from user's current location to the location where the vehicle is parked. In another scenario, the estimation platform 109 may determine that a user is driving. Then, the estimation platform 109 may process information provided by a UE 101 associated with a vehicle to determine real-time traffic information, real-time speed information, route optimization information, or a combination thereof [703]. Thereafter, the estimation platform 109 may calculate the estimated time of arrival from the current location of the vehicle to a parking location. In a further scenario, the estimation platform 109 may determine that a user has parked his car and is walking towards the train station. Then, the estimation platform 109 may process the information provided by a mobile device to determine real-time location of a user, route selection information, obstruction information, or a combination thereof [705]. Next, the estimation platform 109 may calculate the estimated time of arrival from the parking location to the next waypoint (e.g. a train station). In another scenario, the estimation platform 109 may process information provided by the server of a train station to determine train schedules, the number of stops, the number of passengers riding the train, or a combination thereof [707]. Then, the estimation platform 109 may calculate the estimated time of arrival from the public transport station to the destination.

FIG. 8 is a flow diagram for calculating an estimated time of arrival in real-time from multiple devices and/or services, according to one example embodiment. In one scenario, a user may initiate planning a trip to at least one destination [801]. This involves a user providing destination information (e.g. location information, one or more way-points etc.) to at least one UE 101 associated with a vehicle, the user, or a combination thereof [803, 805]. Subsequently, the user may select the mode of transport (e.g. driving, walking, public transport etc.) for different routing segments of the trip [807]. Such information entered by the user may be synchronized with the estimation platform 109 [809], at least one device associated with a vehicle [811], at least one device associated with the user [811], or a combination thereof. After that, the user starts his trip [813]. In one scenario, the estimation platform 109 may use the UE 101 associated with the user (e.g. mobile device) for the first part of the routing segment to navigate the user towards his vehicle [815]. Consequently, the estimation platform 109 may receive real-time location information of the user, information on user's pace, route selection information, or a combination thereof from the mobile device. Then, the estimation platform 109 may record the received information and may share the information with other UE 101s [817]. In one scenario, the UE 101 associated with the user (e.g. a mobile device) may detect changes that may affect the total estimated time of arrival, for example, user walking slower than estimated. Then, the UE 101 associated with the user (e.g. a mobile device) records the changes [819], and analyzes the changes [821]. Such changes are shared with the estimation platform 109 and synchronized with other UE 101's [823]. Then, the changes are presented to the user [825]. Once the user reaches the vehicle [827], the estimation platform 109 may change the active navigation from the UE 101 associated with the user (e.g. a mobile device) to the UE 101 associated with a vehicle (e.g. in-car navigation system) [829]. As the user continues his trip using the in-car navigation system [831], the estimation platform 109 may receive real-time location information of the vehicle, real-time traffic information, or a combination thereof. Such information is recorded and shared by the UE 101 associated with a vehicle (e.g. in-car navigation system) with the estimation platform 109, other UE 101's [833]. In one scenario, if a user drives faster than the estimated speed, then the UE 101 associated with a vehicle (e.g. in-car navigation system) may record the changes since it affects the total estimated time of arrival [835]. The changes are analyzed [837], and synchronized [839] with the estimation platform 109, other UE 101's, or combination thereof. Then, the changes are presented to the user [841].

FIGS. 9 A-D are user interface diagrams that represent a scenario wherein a user is presented with a real-time estimate of the arrival time, according to one example embodiment. In FIG. 9A, a user plans a trip from 1234 South plaza to 1029 B street [913]. The trip includes activities such as walking [901], driving [903], and taking a public transportation [905]. The user starts the trip by walking 40 feet towards Patrick road [907]. Since user activity is synchronized with the estimation platform 109 [909], the estimation platform 109 may process the data provided by the UE 101 associated with the user (e.g. mobile device). For example, the mobile device may provide estimated time of arrival from 1234 South plaza to Patrick road [911]. In FIG. 9B, the user reaches his parked vehicle on Patrick road and starts driving towards Henry drive [915, 917]. Then, the estimation platform 109 may process the data provided by the UE 101 associated with the vehicle (e.g. embedded vehicular navigation system) [919]. Then, the embedded vehicular navigation system may estimate the arrival time based on the traffic conditions, vehicular speed, user activities etc. [921]. In FIG. 9C, the embedded vehicular navigation system may detect traffic congestion [923], whereupon it recalculates the estimated time of arrival and shares the information with the estimation platform 109 [925]. Since, the time of arrival at Henry drive has changed [929], the user may not be able to board the scheduled train. Then, the estimation platform 109 may check the server associated with the train system for the next available train [927]. The estimation platform 109 may notify the user on train schedule, so that the user may drive towards the train station accordingly. Once the user reaches the train station and boards the train, the estimation platform 109 may check with the server of the train system for the arrival time of the train in the 1028 B street. In one scenario, there can be an agreement with the public transport system (e.g. train system) and their data can be shared in real time to generate the estimated time of arrival.

The processes described herein for calculating a final estimated time of arrival to at least one destination location based, at least in part, on multiple estimated time of arrival provided by one or more devices and/or services for one or more routing segments may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

Figure 10:
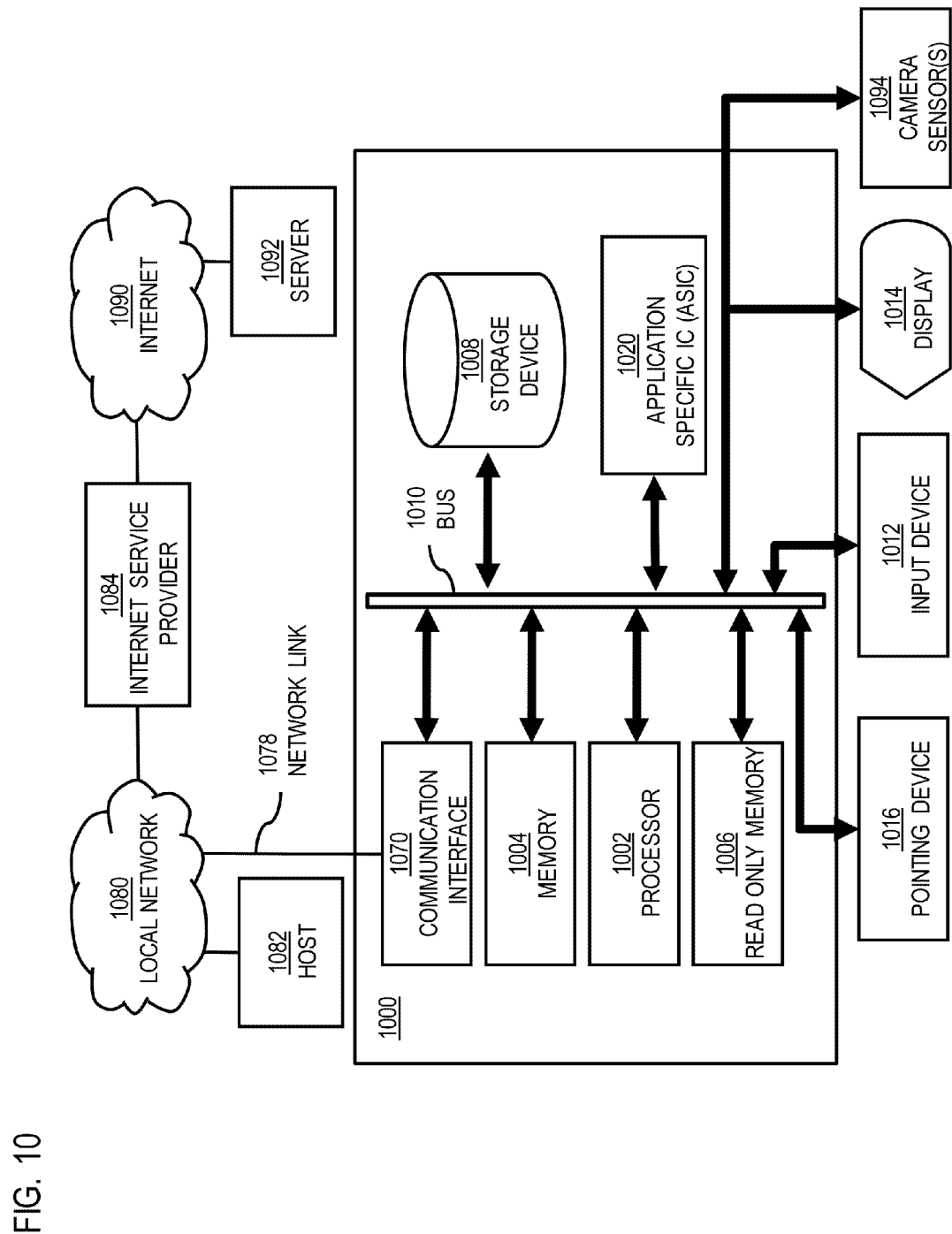
FIG. 10 is a diagram of hardware that can be used to implement an embodiment of the invention.

FIG. 10 illustrates a computer system 1000 upon which an embodiment of the invention may be implemented. Although computer system 1000 is depicted with respect to a particular device or equipment, it is contemplated that other devices or equipment (e.g., network elements, servers, etc.) within FIG. 10 can deploy the illustrated hardware and components of system 1000. Computer system 1000 is programmed (e.g., via computer program code or instructions) to calculate a final estimated time of arrival to at least one destination location based, at least in part, on multiple estimated time of arrival provided by one or more devices and/or services for one or more routing segments as described herein and includes a communication mechanism such as a bus 1010 for passing information between other internal and external components of the computer system 1000. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1000, or a portion thereof, constitutes a means for performing one or more steps of calculating a final estimated time of arrival to at least one destination location based, at least in part, on multiple estimated time of arrival provided by one or more devices and/or services for one or more routing segments.

A bus 1010 includes one or more parallel conductors of information so that information is transferred quickly among devices coupled to the bus 1010. One or more processors 1002 for processing information are coupled with the bus 1010.

A processor (or multiple processors) 1002 performs a set of operations on information as specified by computer program code related to calculate a final estimated time of arrival to at least one destination location based, at least in part, on multiple estimated time of arrival provided by one or more devices and/or services for one or more routing segments. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1010 and placing information on the bus 1010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1002, such as a sequence of operation codes, constitute processor instructions, also called computer system instructions or, simply, computer instructions. Processors may be implemented as mechanical, electrical, magnetic, optical, chemical, or quantum components, among others, alone or in combination.

Computer system 1000 also includes a memory 1004 coupled to bus 1010. The memory 1004, such as a random access memory (RAM) or any other dynamic storage device, stores information including processor instructions for calculating a final estimated time of arrival to at least one destination location based, at least in part, on multiple estimated time of arrival provided by one or more devices and/or services for one or more routing segments. Dynamic memory allows information stored therein to be changed by the computer system 1000. RAM allows a unit of information stored at a location called a memory address to be stored and retrieved independently of information at neighboring addresses. The memory 1004 is also used by the processor 1002 to store temporary values during execution of processor instructions. The computer system 1000 also includes a read only memory (ROM) 1006 or any other static storage device coupled to the bus 1010 for storing static information, including instructions, that is not changed by the computer system 1000. Some memory is composed of volatile storage that loses the information stored thereon when power is lost. Also coupled to bus 1010 is a non-volatile (persistent) storage device 1008, such as a magnetic disk, optical disk or flash card, for storing information, including instructions, that persists even when the computer system 1000 is turned off or otherwise loses power.

Information, including instructions for calculating a final estimated time of arrival to at least one destination location based, at least in part, on multiple estimated time of arrival provided by one or more devices and/or services for one or more routing segments, is provided to the bus 1010 for use by the processor from an external input device 1012, such as a keyboard containing alphanumeric keys operated by a human user, a microphone, an Infrared (IR) remote control, a joystick, a game pad, a stylus pen, a touch screen, or a sensor. A sensor detects conditions in its vicinity and transforms those detections into physical expression compatible with the measurable phenomenon used to represent information in computer system 1000. Other external devices coupled to bus 1010, used primarily for interacting with humans, include a display device 1014, such as a cathode ray tube (CRT), a liquid crystal display (LCD), a light emitting diode (LED) display, an organic LED (OLED) display, a plasma screen, or a printer for presenting text or images, and a pointing device 1016, such as a mouse, a trackball, cursor direction keys, or a motion sensor, for controlling a position of a small cursor image presented on the display 1014 and issuing commands associated with graphical elements presented on the display 1014, and one or more camera sensors 1094 for capturing, recording and causing to store one or more still and/or moving images (e.g., videos, movies, etc.) which also may comprise audio recordings. In some embodiments, for example, in embodiments in which the computer system 1000 performs all functions automatically without human input, one or more of external input device 1012, display device 1014 and pointing device 1016 may be omitted.

In the illustrated embodiment, special purpose hardware, such as an application specific integrated circuit (ASIC) 1020, is coupled to bus 1010. The special purpose hardware is configured to perform operations not performed by processor 1002 quickly enough for special purposes. Examples of ASICs include graphics accelerator cards for generating images for display 1014, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1000 also includes one or more instances of a communications interface 1070 coupled to bus 1010. Communication interface 1070 provides a one-way or two-way communication coupling to a variety of external devices that operate with their own processors, such as printers, scanners and external disks. In general the coupling is with a network link 1078 that is connected to a local network 1080 to which a variety of external devices with their own processors are connected. For example, communication interface 1070 may be a parallel port or a serial port or a universal serial bus (USB) port on a personal computer. In some embodiments, communications interface 1070 is an integrated services digital network (ISDN) card or a digital subscriber line (DSL) card or a telephone modem that provides an information communication connection to a corresponding type of telephone line. In some embodiments, a communication interface 1070 is a cable modem that converts signals on bus 1010 into signals for a communication connection over a coaxial cable or into optical signals for a communication connection over a fiber optic cable. As another example, communications interface 1070 may be a local area network (LAN) card to provide a data communication connection to a compatible LAN, such as Ethernet. Wireless links may also be implemented. For wireless links, the communications interface 1070 sends or receives or both sends and receives electrical, acoustic or electromagnetic signals, including infrared and optical signals, that carry information streams, such as digital data. For example, in wireless handheld devices, such as mobile telephones like cell phones, the communications interface 1070 includes a radio band electromagnetic transmitter and receiver called a radio transceiver. In certain embodiments, the communications interface 1070 enables connection to the communication network 107 for calculating a final estimated time of arrival to at least one destination location based, at least in part, on multiple estimated time of arrival provided by one or more devices and/or services for one or more routing segments to the UE 101.

The term "computer-readable medium" as used herein refers to any medium that participates in providing information to processor 1002, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 1008. Volatile media include, for example, dynamic memory 1004. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 1020.

Network link 1078 typically provides information communication using transmission media through one or more networks to other devices that use or process the information. For example, network link 1078 may provide a connection through local network 1080 to a host computer 1082 or to equipment 1084 operated by an Internet Service Provider (ISP). ISP equipment 1084 in turn provides data communication services through the public, world-wide packet-switching communication network of networks now commonly referred to as the Internet 1090.

A computer called a server host 1092 connected to the Internet hosts a process that provides a service in response to information received over the Internet. For example, server host 1092 hosts a process that provides information representing video data for presentation at display 1014. It is contemplated that the components of system 1000 can be deployed in various configurations within other computer systems, e.g., host 1082 and server 1092.

At least some embodiments of the invention are related to the use of computer system 1000 for implementing some or all of the techniques described herein. According to one embodiment of the invention, those techniques are performed by computer system 1000 in response to processor 1002 executing one or more sequences of one or more processor instructions contained in memory 1004. Such instructions, also called computer instructions, software and program code, may be read into memory 1004 from another computer-readable medium such as storage device 1008 or network link 1078. Execution of the sequences of instructions contained in memory 1004 causes processor 1002 to perform one or more of the method steps described herein. In alternative embodiments, hardware, such as ASIC 1020, may be used in place of or in combination with software to implement the invention. Thus, embodiments of the invention are not limited to any specific combination of hardware and software, unless otherwise explicitly stated herein.

The signals transmitted over network link 1078 and other networks through communications interface 1070, carry information to and from computer system 1000. Computer system 1000 can send and receive information, including program code, through the networks 1080, 1090 among others, through network link 1078 and communications interface 1070. In an example using the Internet 1090, a server host 1092 transmits program code for a particular application, requested by a message sent from computer 1000, through Internet 1090, ISP equipment 1084, local network 1080 and communications interface 1070. The received code may be executed by processor 1002 as it is received, or may be stored in memory 1004 or in storage device 1008 or any other non-volatile storage for later execution, or both. In this manner, computer system 1000 may obtain application program code in the form of signals on a carrier wave.

Various forms of computer readable media may be involved in carrying one or more sequence of instructions or data or both to processor 1002 for execution. For example, instructions and data may initially be carried on a magnetic disk of a remote computer such as host 1082. The remote computer loads the instructions and data into its dynamic memory and sends the instructions and data over a telephone line using a modem. A modem local to the computer system 1000 receives the instructions and data on a telephone line and uses an infra-red transmitter to convert the instructions and data to a signal on an infra-red carrier wave serving as the network link 1078. An infrared detector serving as communications interface 1070 receives the instructions and data carried in the infrared signal and places information representing the instructions and data onto bus 1010. Bus 1010 carries the information to memory 1004 from which processor 1002 retrieves and executes the instructions using some of the data sent with the instructions. The instructions and data received in memory 1004 may optionally be stored on storage device 1008, either before or after execution by the processor 1002.

FIG. 11 illustrates a chip set or chip 1100 upon which an embodiment of the invention may be implemented. Chip set 1100 is programmed to calculate a final estimated time of arrival to at least one destination location based, at least in part, on multiple estimated time of arrival provided by one or more devices and/or services for one or more routing segments as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1100 can be implemented in a single chip. It is further contemplated that in certain embodiments the chip set or chip 1100 can be implemented as a single "system on a chip." It is further contemplated that in certain embodiments a separate ASIC would not be used, for example, and that all relevant functions as disclosed herein would be performed by a processor or processors. Chip set or chip 1100, or a portion thereof, constitutes a means for performing one or more steps of providing user interface navigation information associated with the availability of functions. Chip set or chip 1100, or a portion thereof, constitutes a means for performing one or more steps of calculating a final estimated time of arrival to at least one destination location based, at least in part, on multiple estimated time of arrival provided by one or more devices and/or services for one or more routing segments.

In one embodiment, the chip set or chip 1100 includes a communication mechanism such as a bus 1101 for passing information among the components of the chip set 1100. A processor 1103 has connectivity to the bus 1101 to execute instructions and process information stored in, for example, a memory 1105. The processor 1103 may include one or more processing cores with each core configured to perform independently. A multi-core processor enables multiprocessing within a single physical package. Examples of a multi-core processor include two, four, eight, or greater numbers of processing cores. Alternatively or in addition, the processor 1103 may include one or more microprocessors configured in tandem via the bus 1101 to enable independent execution of instructions, pipelining, and multithreading. The processor 1103 may also be accompanied with one or more specialized components to perform certain processing functions and tasks such as one or more digital signal processors (DSP) 1107, or one or more application-specific integrated circuits (ASIC) 1109. A DSP 1107 typically is configured to process real-world signals (e.g., sound) in real time independently of the processor 1103. Similarly, an ASIC 1109 can be configured to performed specialized functions not easily performed by a more general purpose processor. Other specialized components to aid in performing the inventive functions described herein may include one or more field programmable gate arrays (FPGA), one or more controllers, or one or more other special-purpose computer chips.

In one embodiment, the chip set or chip 1100 includes merely one or more processors and some software and/or firmware supporting and/or relating to and/or for the one or more processors.

The processor 1103 and accompanying components have connectivity to the memory 1105 via the bus 1101. The memory 1105 includes both dynamic memory (e.g., RAM, magnetic disk, writable optical disk, etc.) and static memory (e.g., ROM, CD-ROM, etc.) for storing executable instructions that when executed perform the inventive steps described herein to calculate a final estimated time of arrival to at least one destination location based, at least in part, on multiple estimated time of arrival provided by one or more devices and/or services for one or more routing segments. The memory 1105 also stores the data associated with or generated by the execution of the inventive steps.

Figure 12:
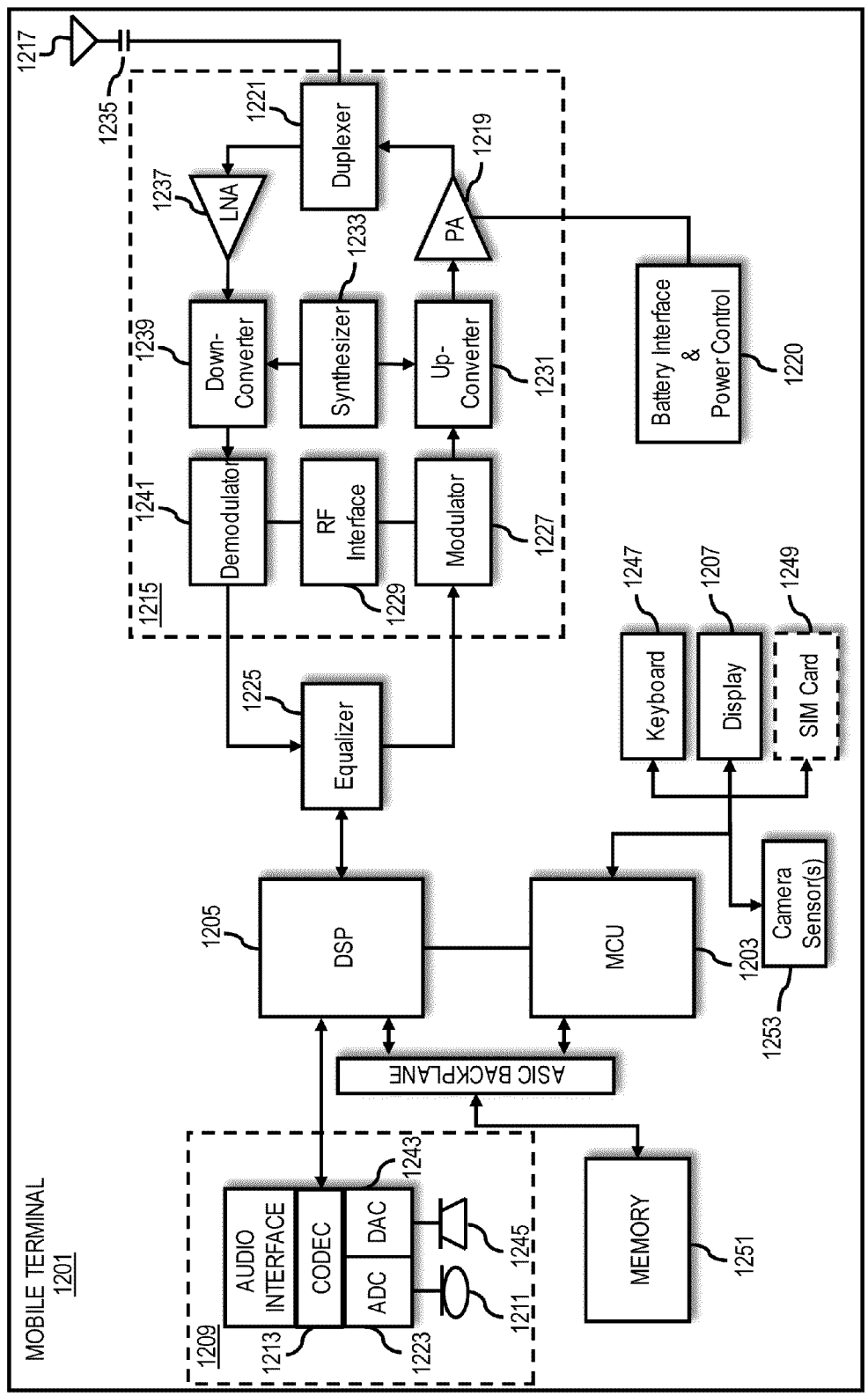
FIG. 12 is a diagram of a mobile terminal (e.g., handset) that can be used to implement an embodiment of the invention.

FIG. 12 is a diagram of exemplary components of a mobile terminal (e.g., handset) for communications, which is capable of operating in the system of FIG. 1, according to one embodiment. In some embodiments, mobile terminal 1201, or a portion thereof, constitutes a means for performing one or more steps of calculating a final estimated time of arrival to at least one destination location based, at least in part, on multiple estimated time of arrival provided by one or more devices and/or services for one or more routing segments. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1203, a Digital Signal Processor (DSP) 1205, and a receiver/transmitter unit including a microphone gain control unit and a speaker gain control unit. A main display unit 1207 provides a display to the user in support of various applications and mobile terminal functions that perform or support the steps of calculating a final estimated time of arrival to at least one destination location based, at least in part, on multiple estimated time of arrival provided by one or more devices and/or services for one or more routing segments. The display 1207 includes display circuitry configured to display at least a portion of a user interface of the mobile terminal (e.g., mobile telephone). Additionally, the display 1207 and display circuitry are configured to facilitate user control of at least some functions of the mobile terminal. An audio function circuitry 1209 includes a microphone 1211 and microphone amplifier that amplifies the speech signal output from the microphone 1211. The amplified speech signal output from the microphone 1211 is fed to a coder/decoder (CODEC) 1213.

A radio section 1215 amplifies power and converts frequency in order to communicate with a base station, which is included in a mobile communication system, via antenna 1217. The power amplifier (PA) 1219 and the transmitter/modulation circuitry are operationally responsive to the MCU 1203, with an output from the PA 1219 coupled to the duplexer 1221 or circulator or antenna switch, as known in the art. The PA 1219 also couples to a battery interface and power control unit 1220.

In use, a user of mobile terminal 1201 speaks into the microphone 1211 and his or her voice along with any detected background noise is converted into an analog voltage. The analog voltage is then converted into a digital signal through the Analog to Digital Converter (ADC) 1223. The control unit 1203 routes the digital signal into the DSP 1205 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1225 for compensation of any frequency-dependent impairments that occur during transmission though the air such as phase and amplitude distortion. After equalizing the bit stream, the modulator 1227 combines the signal with a RF signal generated in the RF interface 1229. The modulator 1227 generates a sine wave by way of frequency or phase modulation. In order to prepare the signal for transmission, an up-converter 1231 combines the sine wave output from the modulator 1227 with another sine wave generated by a synthesizer 1233 to achieve the desired frequency of transmission. The signal is then sent through a PA 1219 to increase the signal to an appropriate power level. In practical systems, the PA 1219 acts as a variable gain amplifier whose gain is controlled by the DSP 1205 from information received from a network base station. The signal is then filtered within the duplexer 1221 and optionally sent to an antenna coupler 1235 to match impedances to provide maximum power transfer. Finally, the signal is transmitted via antenna 1217 to a local base station. An automatic gain control (AGC) can be supplied to control the gain of the final stages of the receiver. The signals may be forwarded from there to a remote telephone which may be another cellular telephone, any other mobile phone or a landline connected to a Public Switched Telephone Network (PSTN), or other telephony networks.

Voice signals transmitted to the mobile terminal 1201 are received via antenna 1217 and immediately amplified by a low noise amplifier (LNA) 1237. A down-converter 1239 lowers the carrier frequency while the demodulator 1241 strips away the RF leaving only a digital bit stream. The signal then goes through the equalizer 1225 and is processed by the DSP 1205. A Digital to Analog Converter (DAC) 1243 converts the signal and the resulting output is transmitted to the user through the speaker 1245, all under control of a Main Control Unit (MCU) 1203 which can be implemented as a Central Processing Unit (CPU).

The MCU 1203 receives various signals including input signals from the keyboard 1247. The keyboard 1247 and/or the MCU 1203 in combination with other user input components (e.g., the microphone 1211) comprise a user interface circuitry for managing user input. The MCU 1203 runs a user interface software to facilitate user control of at least some functions of the mobile terminal 1201 to calculate a final estimated time of arrival to at least one destination location based, at least in part, on multiple estimated time of arrival provided by one or more devices and/or services for one or more routing segments. The MCU 1203 also delivers a display command and a switch command to the display 1207 and to the speech output switching controller, respectively. Further, the MCU 1203 exchanges information with the DSP 1205 and can access an optionally incorporated SIM card 1249 and a memory 1251. In addition, the MCU 1203 executes various control functions required of the terminal. The DSP 1205 may, depending upon the implementation, perform any of a variety of conventional digital processing functions on the voice signals. Additionally, DSP 1205 determines the background noise level of the local environment from the signals detected by microphone 1211 and sets the gain of microphone 1211 to a level selected to compensate for the natural tendency of the user of the mobile terminal 1201.

The CODEC 1213 includes the ADC 1223 and DAC 1243. The memory 1251 stores various data including call incoming tone data and is capable of storing other data including music data received via, e.g., the global Internet. The software module could reside in RAM memory, flash memory, registers, or any other form of writable storage medium known in the art. The memory device 1251 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1249 carries, for instance, important information, such as the cellular phone number, the carrier supplying service, subscription details, and security information. The SIM card 1249 serves primarily to identify the mobile terminal 1201 on a radio network. The card 1249 also contains a memory for storing a personal telephone number registry, text messages, and user specific mobile terminal settings.

Further, one or more camera sensors 1253 may be incorporated onto the mobile station 1201 wherein the one or more camera sensors may be placed at one or more locations on the mobile station. Generally, the camera sensors may be utilized to capture, record, and cause to store one or more still and/or moving images (e.g., videos, movies, etc.) which also may comprise audio recordings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   determining, utilizing a processor, at least one route, wherein the at least one route includes a segment of a plurality of segments navigated using a plurality of devices or services;
   receiving a plurality of individual estimated times of arrival from the plurality of devices or services,
      wherein the plurality of individual estimated times of arrival are to a location on the segment of the plurality of segments associated with the plurality of devices or services,
      wherein the respective times of arrival of the plurality of individual estimated times of arrival are calculated independently by respective devices or services of the plurality of devices or services;
   causing, at least in part, a calculation of a total estimated time of arrival at the location based, at least in part, on the plurality of individual estimated times of arrival;
   receiving data indicating at least one change to at least one individual estimated time of arrival at the location of the plurality of individual estimated times of arrival; and
   causing, at least in part, a calculation of an updated total estimated time of arrival at the location based, at least in part, on the data indicating the at least one change to the at least one individual estimated time of arrival of the plurality of individual estimated times of arrival.

2. A method of claim 1, further comprising:
   causing, at least in part, a synchronization of the total estimated time of arrival among the plurality of devices or services.

3. A method of claim 1, further comprising:
   determining substantially real-time location data reflecting a progress of at least one device along the at least one route, the plurality of segments, or a combination thereof, wherein the substantially real-time location data is collected respectively by the plurality of devices or services; and
   causing, at least in part, an updating of the total estimated time of arrival, the plurality of individual estimated times of arrival, or a combination thereof based, at least in part, on the substantially real-time location data.

4. A method of claim 1, further comprising:
   causing, at least in part, a transmission of the at least one change to the plurality of devices or services for initiating a calculation of at least one updated individual estimated time of arrival by the plurality of devices or services.

5. A method of claim 1, further comprising:
   determining that the at least one change affects at least one subsequent segment of the plurality of segments; and
   causing, at least in part, an updating of the total estimated time of arrival at the end of the route based, at least in part, on the at least one updated individual estimated time of arrival.

6. A method of claim 5, wherein the at least one change affects the at least one subsequent segment of the plurality of segments if the at least one change results in (a) a re-routing of at least one of the plurality of segments; (b) a difference between the at least one updated individual estimated time of arrival and the at least one individual estimated time of arrival beyond at least one threshold criterion; or (c) a combination thereof.

7. A method of claim 1, wherein the data indicating the at least one change includes substantially real-time sensor data respectively collected by and/or private to the plurality of devices.

8. A method of claim 1, further comprising:
   causing, at least in part, a sharing of the total estimated time of arrival.

9. A method of claim 8, wherein the sharing of the total estimated time of arrival is performed by at least one of the plurality of devices or services associated with at least one of the plurality segments.

10. A method of claim 1, wherein the plurality of segments, the plurality of devices or services, or a combination thereof are associated with multiple modes of transport.

11. An apparatus comprising:
   at least one processor; and
   at least one memory including computer program code for one or more programs, the at least one memory and the computer program code configured to, with the at least one processor, cause the apparatus to perform at least the following, determine at least one route, wherein the at least one route includes a segment of a plurality of segments navigated using a plurality of devices or services, receive a plurality of individual estimated times of arrival from the plurality of devices or services,
wherein the plurality of individual estimated times of arrival are to a location on the segment of the plurality of segments associated with the plurality of devices or services,
wherein the respective times of arrival of the plurality of individual estimated times of arrival are calculated independently by respective devices or services of the plurality of devices or services, cause, at least in part, a calculation of a total estimated time of arrival at the location based, at least in part, on the plurality of individual estimated times of arrival, receive data indicating at least one change to at least one individual estimated time of arrival at the location of the plurality of individual estimated times of arrival, and cause, at least in part, a calculation of an updated total estimated time of arrival at the location based, at least in part, on the data indicating the at least one change to the at least one individual estimated time of arrival of the plurality of individual estimated times of arrival.

12. An apparatus of claim 11, wherein the apparatus is further caused to:
cause, at least in part, a synchronization of the total estimated time of arrival among the plurality of devices or services.

13. An apparatus of claim 11, wherein the apparatus is further caused to:
determine substantially real-time location data reflecting a progress of at least one device along the at least one route, the plurality of segments, or a combination thereof,
wherein the substantially real-time location data is collected respectively by the plurality of devices or services; and
cause, at least in part, an updating of the total estimated time of arrival, the plurality of individual estimated times of arrival, or a combination thereof based, at least in part, on the substantially real-time location data.

14. An apparatus of claim 11, wherein the apparatus is further caused to:
cause, at least in part, a transmission of the at least one change to the plurality of devices or services for initiating a calculation of at least one updated individual estimated time of arrival by the plurality of devices or services.

15. An apparatus of claim 11, wherein the apparatus is further caused to:
determine that the at least one change affects at least one subsequent segment of the plurality of segments; and
cause, at least in part, an updating of the total estimated time of arrival at the end of the route based, at least in part, on the at least one updated individual estimated time of arrival.

16. An apparatus of claim 15, wherein the at least one change affects the at least one subsequent segment of the plurality of segments if the at least one change results in (a) a re-routing of at least one of the plurality of segments; (b) a difference between the at least one updated individual estimated time of arrival and the at least one individual estimated time of arrival beyond at least one threshold criterion; or (c) a combination thereof.

17. An apparatus of claim 11, wherein the data indicating the at least one change includes substantially real-time sensor data respectively collected by and/or private to the plurality of devices.

18. A non-transitory computer-readable storage medium carrying one or more sequences of one or more instructions which, when executed by one or more processors, cause an apparatus to at least perform the following steps:
determine at least one route, wherein the at least one route includes a segment of a plurality of segments navigated using a plurality of devices or services;
receive a plurality of individual estimated times of arrival from the plurality of devices or services,
wherein the plurality of individual estimated times of arrival are to a location on the segment of the plurality of segments associated with the plurality of devices or services,
wherein the respective times of arrival of the plurality of individual estimated times of arrival are calculated independently by respective devices or services of the plurality of devices or services;
cause, at least in part, a calculation of a total estimated time of arrival at the location based, at least in part, on the individual estimated times of arrival;
receive data indicating at least one change to at least one individual estimated time of arrival at the location of the plurality of individual estimated times of arrival; and
cause, at least in part, a calculation of an updated total estimated time of arrival at the location based, at least in part, on the data indicating the at least one change to the at least one individual estimated time of arrival of the plurality of individual estimated times of arrival.

19. A computer-readable storage medium of claim 18, wherein the apparatus is further caused to:
cause, at least in part, a synchronization of the total estimated time of arrival among the plurality of devices or services.

20. A computer-readable storage medium of claim 18, wherein the apparatus is further caused to:
determine that the at least one change affects at least one subsequent segment of the plurality of segments; and
cause, at least in part, an updating of the total estimated time of arrival at the end of the route based, at least in part, on the at least one updated individual estimated time of arrival.

* * * * *